June 16, 1959 — L. B. BLOOD — 2,890,796
FILTER SCREEN IN FUEL DISTRIBUTION
Filed March 12, 1957 — 2 Sheets-Sheet 1
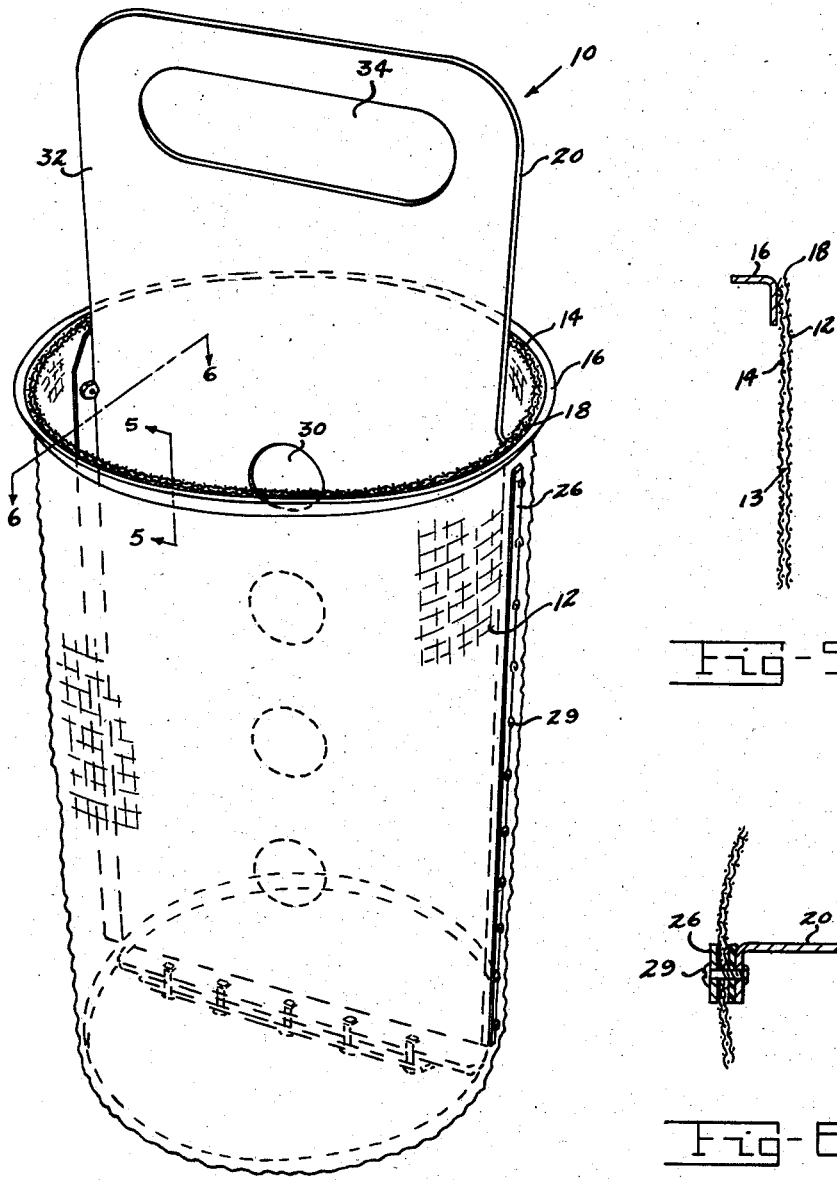
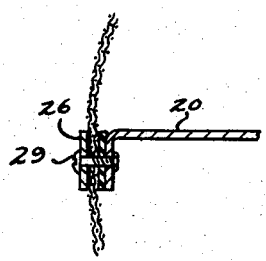
INVENTOR.
LEWIS B. BLOOD
ATTORNEYS

INVENTOR.
LEWIS B. BLOOD
BY
ATTORNEYS

2,890,796
FILTER SCREEN IN FUEL DISTRIBUTION

Lewis B. Blood, Winter Park, Fla.

Application March 12, 1957, Serial No. 645,653

3 Claims. (Cl. 210—470)

(Granted under Title 35, U.S. Code (1952), sec. 266)

The invention described herein may be manufactured and used by or for the United States Government for governmental purposes without payment to me of any royalty thereon.

This invention relates to a fuel filter screen and, more particularly, to a fuel filter screen provided with means for preventing filter screen deformation and rupture due to pressure variations in the fuel pumped through the filter.

Fuel filter screens previously in use in large scale fuel receiving and distribution systems have had a short operational life due to deformations and ruptures in the screen caused by the variations in pressure under which fuel is pumped through the filters and due to fuel surging in the filter. In addition to the considerable cost of filter replacements, the time lost by interrupting the operation of the system while the fuel filter was being replaced became a serious consideration.

Therefore, a principal object of the invention is to devise a fuel filter screen having a long operational life and provided with means for resisting deformation and rupture in the filter due to variations in the pressure of the fuel pumped through the filter.

A further object of this invention is to devise a fuel filter screen provided with means for preventing the disruptive effects of fuel turbulence and fuel surging in the filter as the fuel passes through it.

Still another object of this invention is to provide fuel filter screen that is simple to construct, durable and economical to manufacture.

These and other objects will become more apparent when read in the light of the accompanying drawings and specification wherein:

Fig. 1 is a perspective view of the improved fuel filter screen constructed in accordance with this invention.

Fig. 5 is a vertical section taken on the line 5—5 of Fig. 1 and showing the way the inner and outer baskets are closely secured to each other.

Fig. 6 is a longitudinal section on the line 6—6 of Fig. 1 and showing how the baffle plate is rigidly secured to the inner and outer filter screen.

Figure 2:
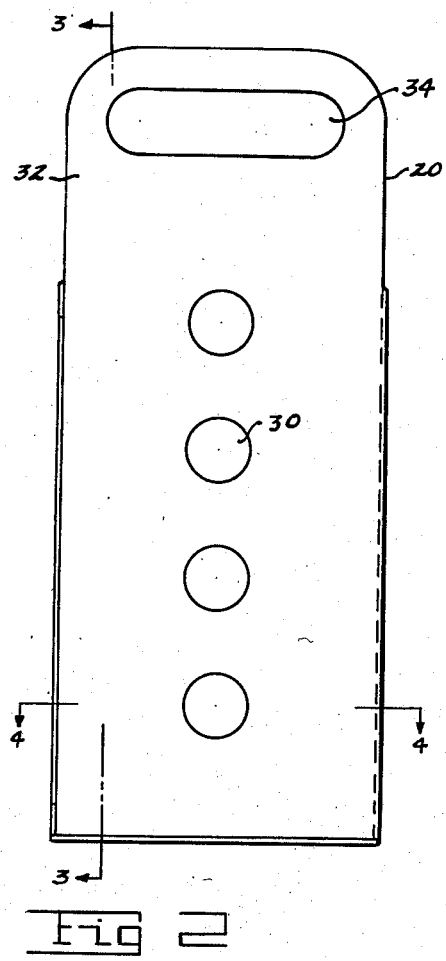
Fig. 2 is a front elevation of the pressure resisting baffle plate that is designed to prevent distortion in the fuel filter screen due to the pressure of fuel passing through the screen.

Referring now to Fig. 1 of the drawing, the fuel filter indicated generally at 10 comprises an outer cylindrical coarse mesh basket 12 and an inner cylindrical fine mesh basket 14. The inner screen 14 is mounted by any conventional means in close fitting relationship against the inner surfaces 13 of basket 12, see Figs. 1 and 5, and is supported by it. A supporting ring 16 is secured by welding or any other conventional means to the top 18 of the filter 10, see Fig. 1. This ring 16 gives some rigidity to the cylindrical configuration of the filter 10 and can be used to mount or position the filter in its designed place.

Figure 4:
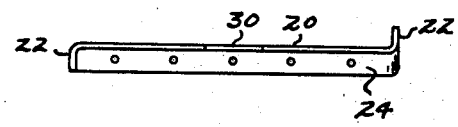
Fig. 4 is a longitudinal section taken on the line 4—4 of Fig. 2 and showing the oppositely disposed mounting flanges on the sides of the baffle plate.
Figure 3:
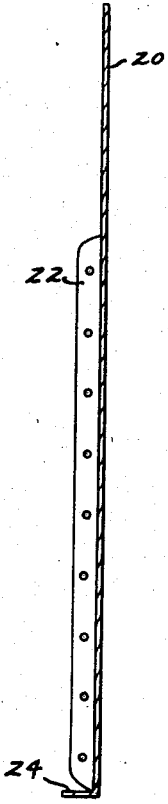
Fig. 3 is a vertical section taken on the line 3—3 of Fig. 2 and showing the side and bottom mounting flanges of the baffle plate.

A pressure resistant baffle support plate 20 for preventing deformation and rupture of the cylindrical filter 10 due to the pressure at which fuel is pumped through the filter, is secured to the opposite sides of the interior of the filter, see Fig. 1. This baffle plate 20 has oppositely disposed mounting flanges 22 on its side edges, see Fig. 4, and a mounting flange 24 on its bottom edge, see Fig. 3. Baffle mounting strips 26 are positioned on the opposite sides and bottom of the outer surfaces of the filter 10. Bolt means 29 extend through these mounting strips and penetrate the baskets 12 and 14 of filter 10 and are secured to the mounting flanges of baffle 20, see Fig. 6. These baffle strips 26, in addition to providing a means for holding baffle plate 20 rigidly secured to the interior of filter 10, also provide additional support for the filter itself, and further help the filter to withstand pressure deformation and rupture.

The baffle plate 20 prevents deformation and rupture in the filter 10 in two ways. First, it provides an internal support for the filter to physically strengthen it so it can withstand the disruptive effects of fluctuating fluid pressures. Secondly, the baffle plate 20 is provided with vertically spaced apertures 30. These apertures 30 are small with respect to the area of the baffle plate, see Fig. 2. As seen in Fig. 1, when the baffle plate 20 is mounted in the interior of filter 10, it effectively divides the interior of the filter into two chambers. These apertures 30 provide a means for equalizing fluid flow in each chamber and because the area of these apertures is small with respect to the size of the baffle plate 20 they restrict the flow of fuel to it and have a dampening effect on fluid turbulence and surging inside the filter. This fluid turbulence and surging is thought to deform a rupture of the filter screen and magnify the destructive effects on the filter caused by variations in the pressure at which fuel is pumped through the filter. In addition, the baffle plate 20 has an integral portion 32 which projects beyond the edge 18 of the filter 10. This portion has an enlarged aperture 34 which is shaped to permit portion 32 of baffle 20 to be used as an integral handle for the filter 10.

Obviously, many modifications and variations of the present invention are possible in the light of the above teachings. It is, therefore, to be understood that the invention may be practiced otherwise than as specifically described and still remain within the scope of the appended claims.

I claim:

1. A fuel filter screen unit for a fuel receiving and distributing system, movable for installation and removal as a unit comprising an outer coarse mesh member substantially cylindrical in form and an inner fine mesh element placed closely adjacent to said outer mesh member, a ring, substantially horizontal and vertical flanges on said ring, said inner screen member and said outer screen element being permanently secured to said vertical flange, means for resisting deformation and rupture of said filter screen due to turbulence in fuel flow comprising a baffle plate positioned substantially on the diameter of the screen unit and bisecting its cubical area, a normally directed integral flange on two opposite edges of said baffle plate, said flanges extending in opposite directions from opposite surfaces of said plate, a pair of baffle mounting strips extending axially and positioned outside of said outer coarse mesh member, means for securing each of said baffle mounting strips to one of said normally directed flanges, a normally directed flange on an end of said baffle plate, a diametrically positioned baffle mounting strip for attachment to said last named flange, said baffle plate having an aperture adjacent one end providing a handle for moving said filter as a unit, said baffle plate being also provided with vertically spaced surge apertures throughout its length for equalizing fluid flow and dampening disruptive fluid turbulence.

2. A baffle for dividing the turbulent fuel flow area of a cylindrical coarse mesh and fine mesh filter comprising a plate, a pair of integral flanges on opposite edges of said plate for attachment to reinforcing strips located axially and exteriorly of said filter, said flanges extending normally from said baffle plate and from the opposite surfaces thereof, said plate provided with surge orifices, said orifices being small in comparison to the area of said plate and in spaced vertical relation, a flange extending normally from a third edge of said baffle plate adapted for attachment to an attaching and reinforcing strip positioned exteriorly of and diametrically across the base of said cylindrical filter.

3. A fuel filter screen unit for a fuel receiving and distributing system, movable for installation and removal as a unit comprising an outer coarse mesh basket member and an inner fine mesh basket member placed closely adjacent to said outer coarse mesh basket member, means for resisting deformation and rupture of said filter screen due to turbulence in fluid flow comprising a baffle plate for substantially bisecting the cubical area of said unit, flanges extending normally from opposite surface edges of said plate, mounting strips positioned outside of said outer coarse mesh basket member for mounting the flanges of said baffle plate, said baffle plate being provided with vertically spaced surge apertures throughout its length for equalizing fluid flow and dampening disruptive fluid turbulence.

References Cited in the file of this patent

UNITED STATES PATENTS

| | | |
|---|---|---|
| 441,667 | Jewell | Dec. 2, 1890 |
| 788,231 | Acker | Apr. 25, 1905 |
| 1,063,047 | Lohrmann | May 27, 1913 |
| 1,767,642 | Anschicks | June 24, 1930 |
| 2,019,094 | Rice et al. | Oct. 29, 1935 |
| 2,041,495 | Schwiers | May 19, 1936 |
| 2,081,198 | Hahn | May 25, 1937 |
| 2,212,318 | Gee | Aug. 20, 1940 |
| 2,496,757 | Sieling | Feb. 7, 1950 |
| 2,521,060 | Hallinan | Sept. 5, 1950 |
| 2,647,636 | Rafferty | Aug. 4, 1953 |
| 2,675,012 | Scales | Apr. 13, 1954 |